US012242214B2

(12) United States Patent
Minamoto

(10) Patent No.: US 12,242,214 B2
(45) Date of Patent: Mar. 4, 2025

(54) TONER CONTAINER WITH SHUTTER PORTION LOCKABLE WITH REMOVAL OF TONER CONTAINER FROM ATTACHMENT PORTION, AND IMAGE FORMING APPARATUS HAVING SAME

(71) Applicant: KYOCERA Document Solutions Inc., Osaka (JP)

(72) Inventor: Riku Minamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/496,778

(22) Filed: Oct. 27, 2023

(65) Prior Publication Data

US 2024/0142895 A1 May 2, 2024

(30) Foreign Application Priority Data

Oct. 31, 2022 (JP) ................................ 2022-173920

(51) Int. Cl.
*G03G 15/08* (2006.01)

(52) U.S. Cl.
CPC ..... *G03G 15/0886* (2013.01); *G03G 15/0875* (2013.01); *G03G 2215/0692* (2013.01)

(58) Field of Classification Search
USPC .......................................................... 399/262
See application file for complete search history.

(56) References Cited

U.S. PATENT DOCUMENTS 7,606,520 B2 * 10/2009 Dawson ............. G03G 15/0886 399/262
2013/0170864 A1 * 7/2013 Newman ............ G03G 21/0088 399/258
2013/0170865 A1 * 7/2013 Carter ................ G03G 21/1676 399/258
2014/0241758 A1 * 8/2014 Rulon ................ G03G 15/0886 399/260
2018/0210371 A1 * 7/2018 Morita ............... G03G 15/0881

FOREIGN PATENT DOCUMENTS

JP 2008191578 A 8/2008

* cited by examiner

*Primary Examiner* — Quana Grainger
(74) *Attorney, Agent, or Firm* — Alleman Hall & Tuttle LLP

(57) ABSTRACT

A shutter lock mechanism moves an engaging portion from a released position to an engaged position when a toner container is removed from an attachment portion. A feeding portion formed with a feeding port or a shutter portion that closes the feeding port is a linking portion. When the engaging portion is at the engaging position, the engaging portion engages with the engaged portion in both a case where the linking portion is at the closed position, and a case where the linking portion is at a semi-closed position between the closed position and the open position. When the linking portion is at a region from the semi-closed position to the closed position, the shutter portion closes the feeding port.

4 Claims, 17 Drawing Sheets

TONER CONTAINER WITH SHUTTER PORTION LOCKABLE WITH REMOVAL OF TONER CONTAINER FROM ATTACHMENT PORTION, AND IMAGE FORMING APPARATUS HAVING SAME

INCORPORATION BY REFERENCE

This application is based upon and claims the benefit of priority from the corresponding Japanese Patent Application No. 2022-173920 filed on Oct. 31, 2022, the entire contents of which are incorporated herein by reference.

BACKGROUND

The present disclosure relates to a toner container including a mechanism that locks a shutter portion that is able to open and close a feeding port of a storage portion that stores toner, and an image forming apparatus.

An electrophotographic image forming apparatus includes a photoconductor on which an electrostatic latent image is formed on a surface thereof, and a developing device that develops the electrostatic latent image using toner. The toner is supplied from the toner container to the developing device.

The toner container is a consumable item that stores the toner and is attached to an attachment portion in a main body of the image forming apparatus.

The main body has an opening that communicates with the attachment portion, and the image forming apparatus has a cover portion that opens and closes the opening. The toner container is replaced in a state in which the cover portion is open.

In order to prevent the toner from leaking, the toner container is provided with a shutter mechanism including a shutter portion that closes the toner feeding port. The shutter mechanism is able to open and close the feeding port by the shutter portion.

The shutter mechanism is switched from a closed state to an open state in a state in which the toner container is attached to the attachment portion.

In addition, it is known that the image forming apparatus includes a mechanism that closes the feeding port in conjunction with an opening operation of the cover portion and opens the feeding port in conjunction with a closing operation of the cover portion. Thus, without requiring any special operation, the toner is prevented from being scattered when the cover portion is opened.

SUMMARY

A toner container according to one aspect of the present disclosure is detachably attached to an attachment portion of an image forming apparatus. The toner container includes a storage portion, a feeding portion, a shutter portion, a shutter linking mechanism, and a shutter lock mechanism. The storage portion stores toner. The feeding portion is a portion formed with a feeding port that communicates between an inner portion and an outer portion of the storage portion. The shutter portion closes the feeding port. The shutter linking mechanism, when receiving a force in a first direction from a force applying portion provided on the attachment portion, moves a linking portion, which is one of the feeding portion and the shutter portion, from a closed position to an open position; and when receiving a force in a second direction from the force applying portion, moves the linking portion from the open position to the closed position. The closed position is a position of the linking portion when the feeding port is closed by the shutter portion. The open position is a position of the linking portion when the feeding port is opened. The shutter lock mechanism has an engaged portion integrally formed with the linking portion and an engaging portion that, by engaging with the engaged portion, restricts movement of the linking portion toward the open position side. The shutter lock mechanism moves the engaging portion from the engaging position to the released position when the toner container is attached to the attachment portion, and moves the engaging portion from the released position to the engaging position when the toner container is removed from the attachment portion. The released position is a position separated from the engaged portion. When the engaging portion is at the engaging position, the engaging portion engages with the engaged portion in both a case where the linking portion is at the closed position, and a case where the linking portion is at a semi-closed position between the closed position and the open position. When the linking portion is at a region from the semi-closed position to the closed position, the shutter portion closes the feeding port.

An image forming apparatus according to another aspect of the present disclosure includes the toner container, an attachment portion, a main body, a cover portion, and a cover linking mechanism. The attachment portion is a portion to which the toner container is attached. The main body encloses the attachment portion and is formed with a main opening leading to the attachment portion. The cover portion is supported by the main body and is able to open and close the main opening. The cover linking mechanism has a force applying portion that applies a force to the shutter mechanism included in the toner container when the toner container is attached to the attachment portion, and links the force applying portion with the opening and closing operation of the cover portion. The cover linking mechanism moves the force applying portion in a first direction when the cover portion is closed, and moves the force applying portion in a second direction when the cover portion is opened.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples that embody a technique according to the present disclosure, and do not limit the technical scope according to the present disclosure.

[First Embodiment: Configuration of Image Forming Apparatus 10]

An image forming apparatus 10 according to the first embodiment includes a printing device 4 that executes a printing process using an electrophotographic method. The printing process is a process that forms an image on a sheet 9. The sheet 9 is an image forming medium such as paper or a sheet-shaped resin member.

Figure 1:
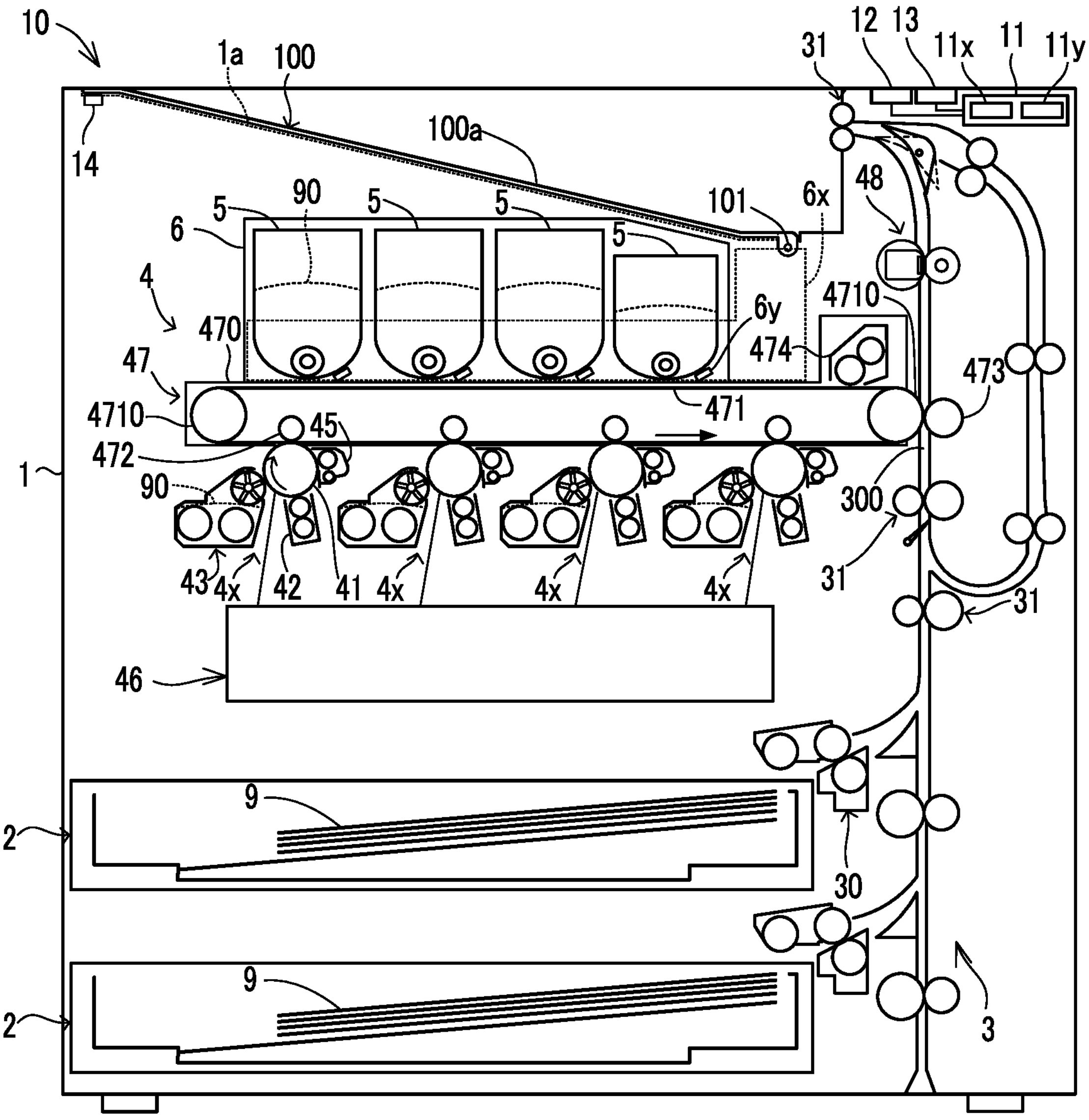
FIG. 1 is a configuration diagram of an image forming apparatus according to a first embodiment.

As shown in FIG. 1, the image forming apparatus 10 includes a main body 1, a sheet storing portion 2, a sheet conveying device 3, a printing device 4, and one or more toner containers 5. The main body 1 is a main housing that accommodates the sheet conveying device 3, the printing device 4, and the toner container(s) 5.

The sheet conveying device 3 includes a sheet feeding device 30 that is driven by a motor (not shown), and a plurality of sets of conveying roller pairs 31. The sheet feeding device 30 feeds a sheet 9 stored in the sheet storing portion 2 to a sheet conveying path 300 inside the main body 1.

A plurality of sets of conveying roller pairs 31 convey the sheet 9 along the sheet conveying path 300 and discharge the sheet 9 from the sheet conveying path 300 to a discharge tray 100*a*.

The printing device 4 forms an image on the sheet 9 that is conveyed along the sheet conveying path 300. The printing device 4 includes an image forming portion 4*x*, an exposure device 46, a transfer device 47, and a fixing device 48. The image forming portion 4*x* includes a drum-shaped photoconductor 41, a charging device 42, a developing device 43, a drum cleaning device 45, and the like.

The image forming apparatus 10 shown in FIG. 1 is a tandem color image forming apparatus. Therefore, the printing device 4 includes four image forming portions 4*x* corresponding to four color toners 90 of yellow, cyan, magenta, and black.

Further, the transfer device 47 includes an intermediate transfer belt 471, a plurality of belt support rollers 4710, four first transfer portions 472 corresponding to the four image forming portions 4*x*, a second transfer portion 473, and a belt cleaning portion 474.

A part of the transfer device 47 is unitized as an intermediate transfer unit 470. The intermediate transfer unit 470 includes an intermediate transfer belt 471, a plurality of belt support rollers 4710, four first transfer portions 472, and a belt cleaning portion 474.

In the image forming portion 4*x*, the photoconductor 41 rotates, and the charging device 42 charges a surface of the photoconductor 41. Furthermore, the exposure device 46 writes an electrostatic latent image on the surface of the photoconductor 41.

Moreover, the developing device 43, by supplying toner 90 to the surface of the photoconductor 41, develops the electrostatic latent image as a toner image. Note that the toner 90 is a powder developing agent. The photoconductor 41 is an example of an image-carrying member that carries the toner image.

The transfer device 47 transfers the toner image onto the sheet 9 on the sheet conveying path 300. The first transfer portion 472 transfers the toner image carried on the photoconductor 41 to a surface of the intermediate transfer belt 471. Thus, a color toner image is formed on the surface of the intermediate transfer belt 471. The intermediate transfer belt 471 is an example of an intermediate transfer body.

The second transfer portion 473 transfers the toner image transferred to the intermediate transfer belt 471 onto the sheet 9 on the sheet conveying path 300.

Note that in a case where the image forming apparatus 10 is a monochrome image forming apparatus, the first transfer portion 472 transfers the toner image on the photoconductor 41 to the sheet 9 on the sheet conveying path 300.

The drum cleaning device 45 removes waste toner remaining on the surface of the photoconductor 41. The belt cleaning portion 474 removes waste toner remaining on the intermediate transfer belt 471.

The fixing device 48 fixes the toner image transferred to the sheet 9 to the sheet 9 by applying heat and pressure.

The image forming apparatus 10 further includes a control device 11 that controls the sheet conveying device 3 and the printing device 4, an operation device 12, and a display device 13 (see FIG. 1).

The control device 11 includes a processor 11*x* that executes a computer program, and a storage device 11*y* that stores the computer program. By the processor 11*x* executing the computer program, the control device 11 executes various types of data processing and control.

The operation device 12 receives user operations. For example, the operation device 12 includes one or both of a touch panel and a plurality of operation buttons. The display device 13 is a panel display device capable of displaying information.

The toner 90 is supplied from the toner container 5 to the developing device 43. The toner container 5 is a consumable item that stores the toner 90 and is attachable to and detachable from the main body 1.

The image forming apparatus 10 further includes an attachment portion 6 arranged inside the main body 1. That is, the main body 1 includes the attachment portion 6. The toner container 5 is detachably attached to the attachment portion 6.

In the present embodiment, a top surface of the intermediate transfer unit 470 forms a bottom surface of the attachment portion 6. The main body 1 is formed with a main opening 1*a* that communicates with the attachment portion 6.

In the present embodiment, the main opening 1*a* is formed in an upper portion of the main body 1. The image forming apparatus 10 further includes a top cover 100 that closes the main opening 1*a*.

The top cover 100 is able to open and close the main opening 1*a*. The toner container 5 is replaced in a state in which the top cover 100 is open. The top cover 100 is an example of a cover portion.

The top cover 100 is supported by the main body 1 so as to be vertically rotatable. A rotating shaft 101 of the top cover 100 is rotatably supported by the main body 1. In the present embodiment, the top cover 100 forms a discharge tray 100*a*.

The image forming apparatus 10 includes a cover sensor 14 that detects a closed state of the cover (see FIG. 1). The closed state of the cover is a state in which the top cover 100 is closed.

For example, the cover sensor 14 is a contact or non-contact object detection sensor arranged at an edge portion of the main opening 1*a*. The object detection sensor detects the top cover 100 when the top cover 100 is closed.

That is, a state in which the object detection sensor detects the top cover 100 is the closed state of the cover.

For example, the object detection sensor is a limit switch that comes in contact with the top cover 100 in a closed state. In addition, the object detection sensor may be a photosensor that detects the top cover 100 in the closed state in a non-contact manner.

Figure 2:
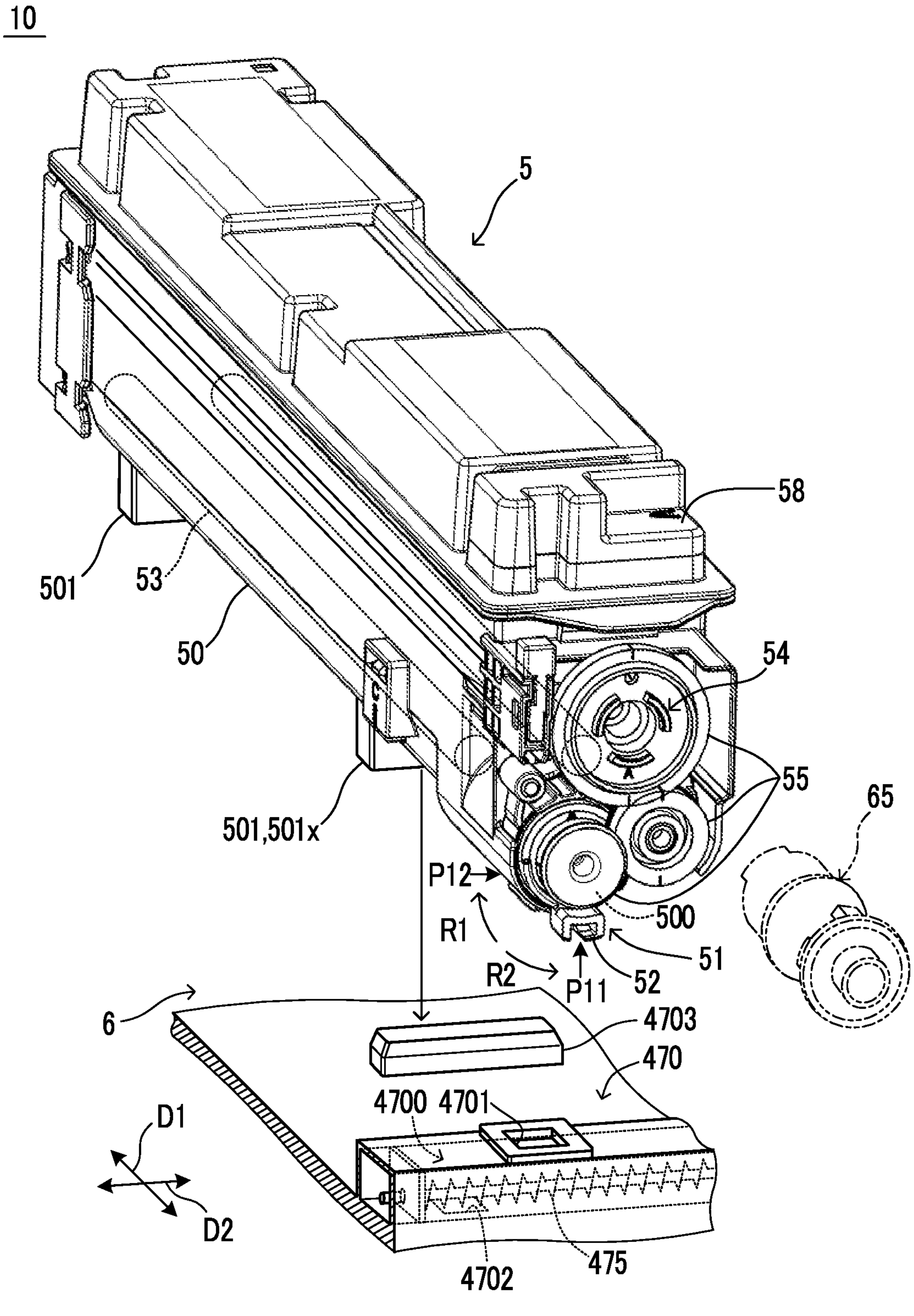
FIG. 2 is a perspective view of a toner container in the image forming apparatus according to the first embodiment.

As shown in FIG. 2, the toner container 5 has a storage portion 50 and a shutter mechanism 51. The storage portion 50 is a container that stores the toner 90.

In each of the figures, a main direction D1 is a longitudinal direction of the toner container 5, and a sub direction D2 is a lateral direction of the toner container 5. That is, the sub direction D2 is a direction crossing the main direction D1. For example, the sub direction D2 is a direction orthogonal to the main direction D1.

The toner container 5 has a feeding port 500 and a shutter mechanism 51. The feeding port 500 is an opening that allows communication between an inner portion of and an outer portion of the storage portion 50. The toner 90 in the storage portion 50 is fed from the feeding port 500. The feeding port 500 and the shutter mechanism 51 are provided at one end portion of the toner container 5 in the main direction D1.

The shutter mechanism 51 is able to switch from one of the closed state and the open state to the other. The closed state is a state in which the feeding port 500 is closed, and the open state is a state in which the feeding port 500 is open.

The shutter mechanism 51 is a mechanism for preventing the toner 90 from leaking out from the feeding port 500 when the toner container 5 is replaced. In a state in which the toner container 5 is attached to the attachment portion 6, the shutter mechanism 51 is switched from the closed state to the open state.

Note that the image forming apparatus 10 includes a first cover linking mechanism 6*x* that switches a state of the shutter mechanism 51 in conjunction with the opening and closing operation of the top cover 100 (see FIG. 1).

Furthermore, the toner container 5 includes a screw conveying member 53, a rotation input portion 54, and a gear mechanism 55 (see FIG. 2). The screw conveying member 53 is arranged inside the storage portion 50. The rotation input portion 54 and the gear mechanism 55 are arranged outside the storage portion 50.

The rotation input portion 54 receives a rotational force that rotates the screw conveying member 53. The gear mechanism 55 transmits the rotational force received by the rotational input portion 54 to the screw conveying member 53.

The screw conveying member 53 rotates in conjunction with the rotation of the rotation input portion 54. The screw conveying member 53 stirs and conveys the toner 90 inside the storage portion 50.

In the present embodiment, a toner conveying path 4700 is formed in the intermediate transfer unit 470 (see FIG. 2). The toner conveying path 4700 has a receiving port 4701 and a supply port 4702.

The receiving port 4701 is an opening formed in an upper surface of the toner conveying path 4700. The supply port 4702 is an opening formed in a lower surface of the toner conveying path 4700.

The toner conveying path 4700 is a passage along which the toner 90 fed from the toner container 5 is conveyed toward the developing device 43. The receiving port 4701 is an opening formed in an upper portion of the toner conveying path 4700.

When the shutter mechanism 51 is in the open state, the feeding port 500 of the toner container 5 and the receiving port 4701 of the toner conveying path 4700 communicate vertically. The supply port 4702 communicates with the toner inlet of the developing device 43 arranged below the toner conveying path 4700.

When the shutter mechanism 51 is in the open state, the toner 90 is fed from the feeding port 500 by the screw conveying member 53 rotating in the storage portion 50. The toner 90 fed from the feeding port 500 falls into the toner conveying path 4700 through the receiving port 4701.

As shown in FIG. 2, a screw conveying member 475 is arranged in the toner conveying path 4700. By the screw conveying member 475 rotating, the toner 90 in the toner conveying path 4700 is supplied into the developing device 43 through the supply port 4702.

When the toner container 5 is attached at a position deviated from an appropriate position in the attachment portion 6, problems such as leakage of the toner 90 from the toner container 5 may occur.

Figure 3:
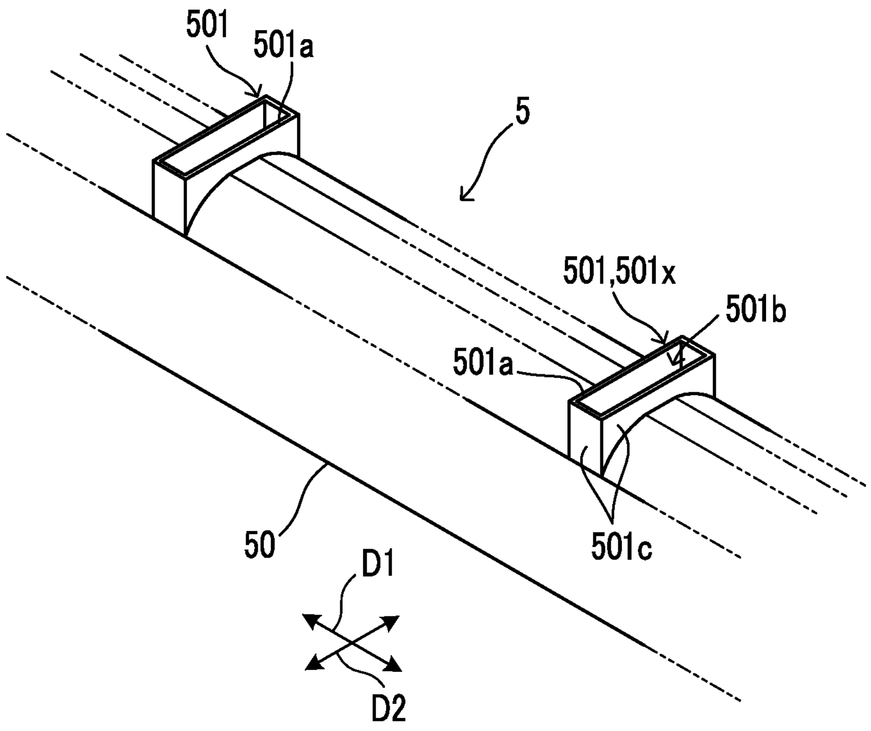
FIG. 3 is a perspective view of leg portions of the toner container in the image forming apparatus according to the first embodiment.

In the present embodiment, the toner container 5 has a plurality of leg portions 501 protruding downward from the bottom surface of the toner container 5 (see FIGS. 2 and 3).

For example, the toner container 5 includes two leg portions 501 formed spaced apart in the main direction D1. Each leg portion 501 is formed extending in the sub direction D2.

Lower surfaces 501*a* of the two leg portions 501 are formed along one plane. Thus, the toner container 5 is stably attached to a flat attaching surface such as a surface of a table.

The attachment portion 6 has a fitting portion 4703 that fits with at least one of the plurality of leg portions 501 when the toner container 5 is arranged on the attachment portion 6 (see FIG. 2). The fitting portion 4703 is formed on an upper surface of the intermediate transfer unit 470.

In the present embodiment, one of the two leg portions 501 is a fitting leg portion 501*x* that can be fitted with the fitting portion 4703 (see FIGS. 2 and 3). The fitting portion 4703 fits with the fitting leg portion 501*x* when the toner container 5 is arranged on the attachment portion 6.

For example, the fitting leg portion 501*x* has a wall portion 501*c* surrounding a hollow portion 501*b* (see FIG. 3). In this case, the fitting portion 4703 has a protruding shape that is fitted into the hollow portion 501*b* of the fitting leg portion 501*x* (see FIG. 2).

Note that the fitting portion 4703 may have a hollow portion, and the fitting leg portion 501*x* may be fitted into the hollow portion of the fitting portion 4703.

The fitting portion 4703 positions the toner container 5 by fitting with the fitting leg portion 501*x*. In the present embodiment, the fitting portion 4703 positions the toner container 5 in the main direction D1 by fitting with the fitting leg portion 501*x*. That is, the fitting portion 4703 restricts the movement of the toner container 5 in the main direction D1.

In general, the degree of freedom in the sizes of the feeding port 500 and the receiving port 4701 in the main direction D1 is small. Therefore, when the toner container 5 is arranged on the attachment portion 6, it is desired that the feeding port 500 be positioned with high accuracy in the main direction D1.

By fitting the fitting leg portion 501*x* with the fitting portion 4703, the toner container 5 is positioned with high accuracy in the main direction D1. As a result, the feeding port 500 is positioned with high accuracy with respect to the receiving port 4701.

In addition, the leg portions 501 also have a function of positioning the toner container 5, and thus it is possible to position the toner container 5 with high accuracy with a simple structure.

In the present embodiment, the toner container 5 is positioned in the sub direction D2 by a guide portion (not shown) provided on the attachment portion 6. However, the fitting portion 4703 may position the toner container 5 in both the main direction D1 and the sub direction D2.

In addition, one of the two leg portions 501 may be a first fitting leg portion for positioning in the main direction D1 and the other may be a second fitting leg portion for positioning in the sub direction D2. In this case, the fitting portion 4703 includes a first fitting portion that fits with the first fitting leg portion and a second fitting portion that fits with the second leg portion.

The first fitting portion positions the toner container 5 in the main direction D1 by fitting with the first fitting leg portion. The second fitting portion positions the toner container 5 in the sub direction D2 by fitting with the second fitting leg portion.

In addition, the image forming apparatus 10 also includes four out-of-toner sensors 6*y* corresponding to the four toner containers 5 (see FIG. 1). The four out-of-toner sensors 6*y* are arranged on the attachment portion 6.

Each of the out-of-toner sensors 6*y* is an example of an out-of-toner detection portion that detects an out-of-toner state. The out-of-toner state is a state in which the remaining amount of toner in the toner container 5 attached to the attachment portion 6 is below the allowable remaining amount.

For example, the out-of-toner sensor 6*y* is a transmissive photosensor. In this case, a pair of transparent windows arranged facing each other are formed in the storage portion 50 of the toner container 5.

The transmissive photosensor includes a light-emitting portion arranged facing one of the pair of windows, and a light-receiving portion arranged facing the other of the pair of windows. The light-receiving portion is arranged in a traveling direction of light emitted by the light-emitting portion.

A state in which the light-receiving portion detects a quantity of light exceeding a predetermined level is the out-of-toner state.

Note that in a case where the transmissive photosensor is employed as the out-of-toner sensor 6*y*, the image forming apparatus 10 has an erroneous detection prevention function corresponding to non-attachment of the toner container 5. The erroneous detection prevention function is a function to prevent erroneous detection of the out-of-toner state when the toner container 5 is not attached.

As a first example, the image forming apparatus 10 includes a container sensor that detects the toner container 5 attached to the attachment portion 6. In this case, when the container sensor does not detect the toner container 5, the processor 11*x* does not refer to the detection state of the out-of-toner sensor 6*y*.

As a second example, the image forming apparatus 10 includes a light blocking mechanism for blocking light between the light-emitting portion and the light-receiving portion when the toner container 5 is not attached to the attachment portion 6.

By adopting the first example or the second example, the erroneous detection prevention function is achieved.

The processor 11*x* outputs detection information indicating a detection state of the out-of-toner sensor 6*y* to the display device 13. In addition, the processor 11*x* is able to execute processing for outputting the detection information to a display portion of a host device via a communication device (not shown). The host device is an information processing apparatus with which the processor 11x is able to communicate via the communication device.

Note that the processor 11x may execute an out-of-toner determination process for determining the out-of-toner state. For example, the out-of-toner determination process includes a process of deriving an estimated value of the consumed amount of the toner 90 each time the printing process is executed, a process of deriving an integrated value of the estimated values, and a process for comparing the integrated value and a reference value.

The processor 11x determines that the out-of-toner state has occurred when the integrated value exceeds the reference value. In this case, the processor 11x is an example of the out-of-toner detection portion.

The user may miss or misread the display of the detection information of the out-of-toner sensor 6y. In that case, the toner container 5 for which the out-of-toner state has not been detected may be replaced and the toner 90 may be wasted.

[Container Lock Mechanism 7]

Figure 4:
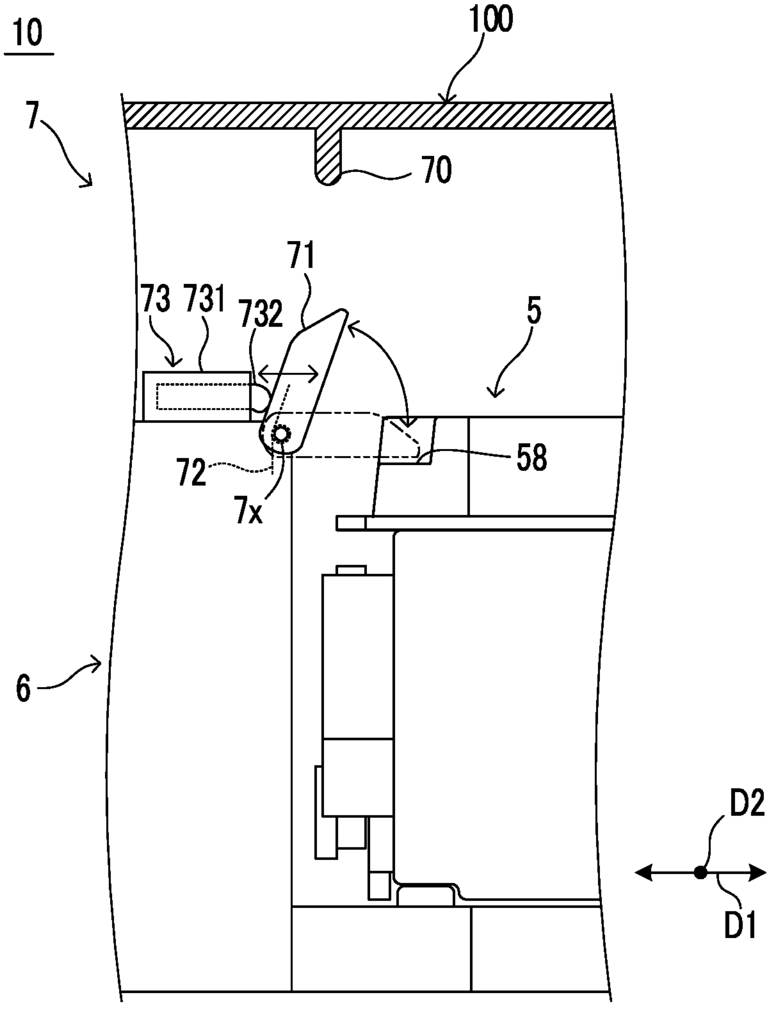
FIG. 4 is a diagram showing a container lock mechanism in a released state when a cover portion is open in the image forming apparatus according to the first embodiment.
Figure 5:
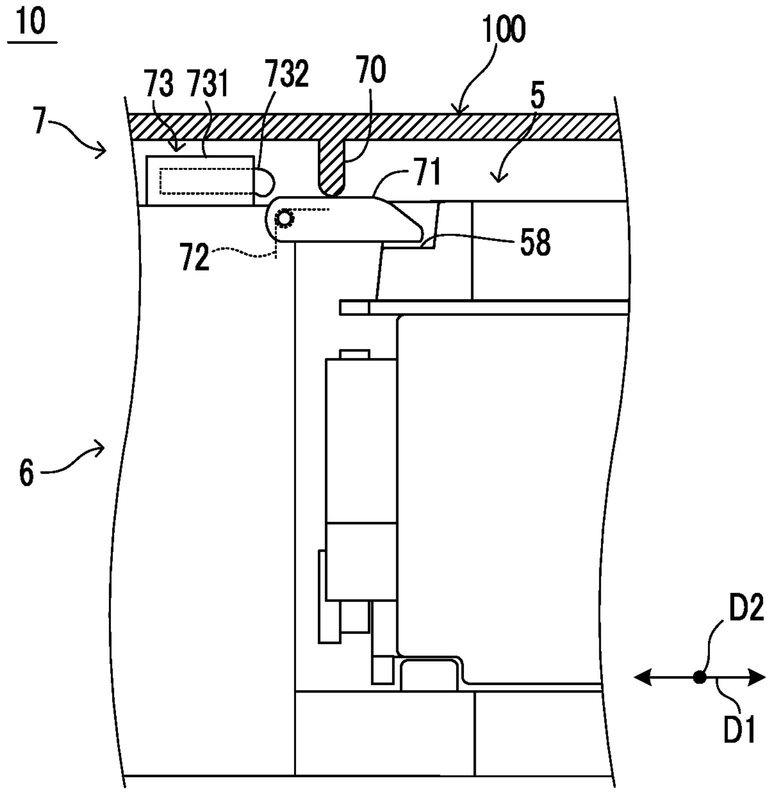
FIG. 5 is a diagram showing the container lock mechanism in the released state when the cover portion is closed in the image forming apparatus according to the first embodiment.
Figure 6:
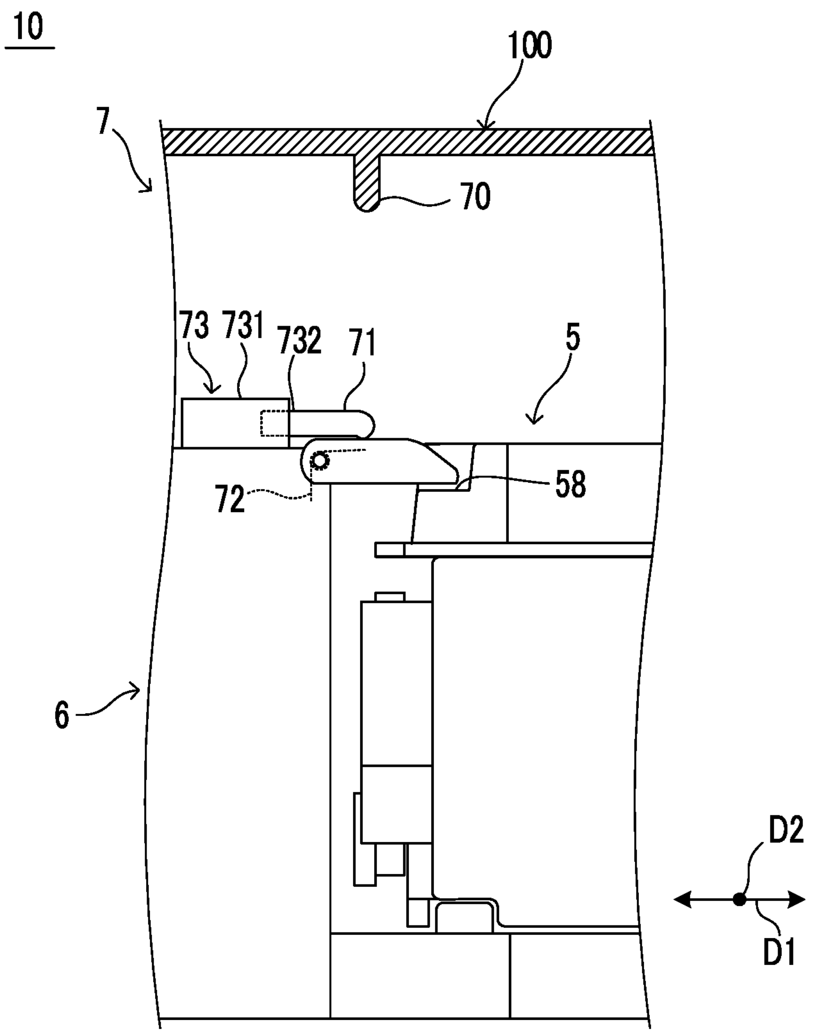
FIG. 6 is a diagram showing the container lock mechanism in the released state when the cover portion is open in the image forming apparatus according to the first embodiment.

As shown in FIGS. 4 to 6, the image forming apparatus 10 further includes a container lock mechanism 7.

The container lock mechanism 7 is a mechanism capable of restricting removal of the toner container 5 from the attachment portion 6.

The container lock mechanism 7 includes a contact portion 70, a rotating member 71, a spring 72, and a solenoid 73 (see FIG. 4).

The contact portion 70 is formed so as to protrude from an inner surface of the top cover 100. The rotating member 71 is rotatably supported within the main body 1 by a rotating shaft 7x. The rotating member 71 is movable between a restricted position and a retreat position.

FIG. 4 shows a state in which the rotating member 71 is at the retreat position, and FIGS. 5 and 6 show states in which the rotating member 71 is at the restricted position.

When the rotating member 71 is at the restricted position, the rotating member 71 protrudes into the entrance of the attachment portion 6 and faces a locked portion 58 of the toner container 5 from above (see FIGS. 5 and 6). The locked portion 58 is formed on the upper surface of the toner container 5.

When the rotating member 71 is at the restricted position, the rotating member 71 protrudes to the entrance of the attachment portion 6 to restrict removal of the toner container 5 from the attachment portion 6 (see FIGS. 5 and 6). The rotating member 71 is an example of a restricting member.

The retreat position is a position separated away from the entrance of the attachment portion 6 (see FIG. 4). The rotating member 71 does not restrict removal of the toner container 5 from the attachment portion 6 when it is at the retreat position.

The spring 72 is provided inside the main body 1. The spring 72 biases the rotating member 71 toward the retreat position. For example, the spring 72 is a torsion spring supported by the rotating shaft 7x. The spring 72 is an example of an elastic member.

The contact portion 70 comes in contact with the rotating member 71 when the top cover 100 is closed. Thus, the contact portion 70 moves the rotating member 71 from the retreat position to the restricted position against the biasing force of the spring 72 (see FIG. 5).

On the other hand, when the top cover 100 is open, the spring 72 moves the rotating member 71 from the restricted position to the retreat position. In the present embodiment, the contact portion 70 and the spring 72 constitute a second cover linking mechanism.

The second cover linking mechanism moves the rotating member 71 from the retreat position to the restricted position in conjunction with the closing operation of the top cover 100 (see FIG. 4). Furthermore, the second cover linking mechanism moves the rotating member 71 from the restricted position to the retreat position in conjunction with the opening operation of the top cover 100 (see FIG. 5).

The solenoid 73 has a main body portion 731 and an actuator portion 732 (see FIG. 4). The solenoid 73 operates according to a control signal output from the processor 11x. The control signal is a signal corresponding to the detection result of the out-of-toner sensor 6y.

The actuator portion 732 is supported by the main body portion 731 so as to be able to expand and contract with respect to the main body portion 731. The main body portion 731 drives the actuator portion 732 according to the control signal.

The actuator portion 732 is movable between a reference position and an expanded position extending longer from the main body portion 731 than the reference position. FIGS. 4 and 5 show a state in which the actuator portion 732 is at the reference position, and FIG. 6 shows a state in which the actuator portion 732 is at the expanded position.

The main body portion 731 moves the actuator portion 732 from one of the reference position and the expanded position to the other according to the control signal.

At the expanded position, the actuator portion 732 restricts the movement of the rotating member 71 to the retreat position and holds the rotating member 71 at the restricted position (see FIG. 6). On the other hand, at the reference position, the actuator portion 732 releases the holding of the rotating member 71 at the restricted position (see FIGS. 4 and 5).

That is, the solenoid 73 switches from one of, a state in which the rotating member 71 is locked at the restricted position and a state in which the locking of the rotating member 71 is released, to the other according to the control signal. The processor 11x outputs the control signal to the solenoid 73 according to the detection result of the out-of-toner sensor 6y.

More specifically, the processor 11x outputs a lock signal as the control signal when the out-of-toner sensor 6y does not detect the out-of-toner state under a condition that the cover sensor 14 detects the cover closed state.

By the lock signal being input, the solenoid 73 holds the actuator portion 732 at the expanded position. Thus, the solenoid 73 holds the rotating member 71 at the restricted position (see FIG. 6).

In the present embodiment, the solenoid 73 restricts the movement of the rotating member 71 to the retreat position by the second cover linking mechanism when the out-of-toner state is not detected, and holds the rotating member 71 at the restricted position (see FIG. 6).

On the other hand, the processor 11x outputs a release signal as the control signal when the out-of-toner sensor 6y detects the out-of-toner state under a condition that the cover sensor 14 detects the cover closed state.

By the release signal being input, the solenoid 73 holds the actuator portion 732 at the reference position. Thus, the state in which the solenoid 73 holds the rotating member 71 at the restricted position is released (see FIGS. 4 and 5).

That is, when the out-of-toner state is detected, the solenoid 73 releases the rotation member 71 from being held at the restricted position. The solenoid 73 is an example of a restricting member locking portion.

By employing the container lock mechanism 7, it is possible to prevent replacement of the toner container 5 for which the out-of-toner state has not been detected.

The shutter mechanism 51 switches from the open state to the closed state in conjunction with the opening operation of the top cover 100, and switches from the closed state to the open state in conjunction with the closing operation of the top cover 100. Thus, without requiring any special operation, the toner 90 in the storage portion 50 is prevented from being scattered when the top cover 100 is opened.

The shutter mechanism 51 includes a force receiving portion 52 (see FIG. 2). The force receiving portion 52 is a portion that receives an external force for operating the shutter mechanism 51 under a condition in which the toner container 5 is attached to the attachment portion 6.

Figure 7:
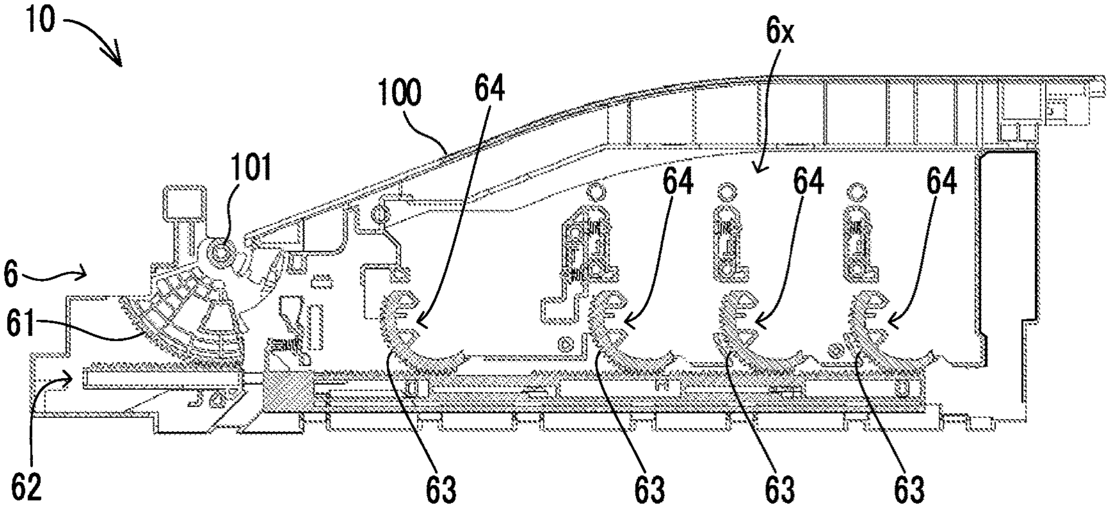
FIG. 7 is a cross-sectional view of a first cover linking mechanism when the cover portion is closed in the image forming apparatus according to the first embodiment.
Figure 8:
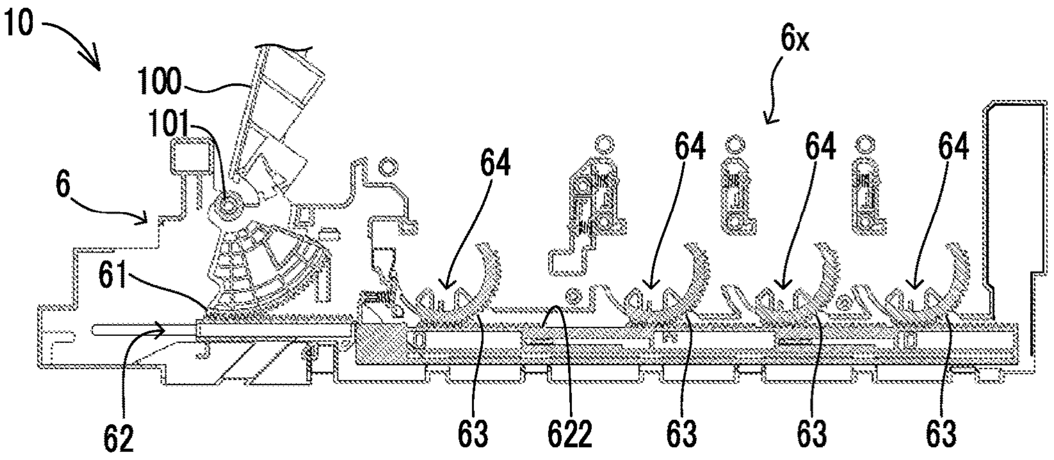
FIG. 8 is a cross-sectional view of the first cover linking mechanism when the cover portion is open in the image forming apparatus according to the first embodiment.

The force receiving portion 52 receives an external force from a force applying portion 64 provided on the attachment portion 6 (see FIGS. 7 and 8). The force receiving portion 52 is a movable portion provided in the toner container 5. The force applying portion 64 is a movable portion provided on the attachment portion 6.

The force applying portion 64 engages with the force receiving portion 52 when the toner container 5 is attached to the attachment portion 6.

The force receiving portion 52 moves from one of an initial position P11 and a use position P12 to the other by receiving force from the force applying portion 64 (see FIG. 2).

In the following description, a direction from the initial position P11 to the use position P12 is called a first direction R1, and a direction from the use position P12 to the initial position P11 is called a second direction R2 (see FIGS. 2 to 17).

The force receiving portion 52, by receiving a force in the first direction R1 from the force applying portion 64, moves from the initial position P11 to the use position P12. Thus, the shutter mechanism 51 is switched from the closed state to the open state.

On the other hand, the force receiving portion 52, by receiving a force in the second direction R2 from the force applying portion 64, moves from the use position P12 to the initial position P11. Thus, the shutter mechanism 51 is switched from the open state to the closed state.

The toner container 5 includes a shutter lock mechanism 56 that holds the shutter mechanism 51 in the closed state (see FIGS. 11 to 15). The shutter lock mechanism 56, by engaging with a part of the shutter mechanism 51, holds the shutter mechanism 51 in the closed state.

The shutter lock mechanism 56 prevents the shutter mechanism 51 from being switched from the closed state to the open state by careless operation.

However, there are cases in which the toner container 5 may be removed from the attachment portion 6 while the top cover 100 is not completely open. In this case, the toner container 5 may be removed from the attachment portion 6 before the shutter mechanism 51 is completely switched from the open state to the closed state.

It is desirable that the shutter lock mechanism 56 be able to prevent the shutter mechanism 51 from switching to the open state even in a case where the shutter mechanism 51 is not in the completely closed state.

As will be described later, even in a case where the toner container 5 is removed from the main body 1 under conditions in which the shutter mechanism 51 is not in the completely closed state, the shutter lock mechanism 56 has a configuration for preventing the shutter mechanism 51 from switching to the open state.

[Configuration of Shutter Mechanism 51]

Figure 11:
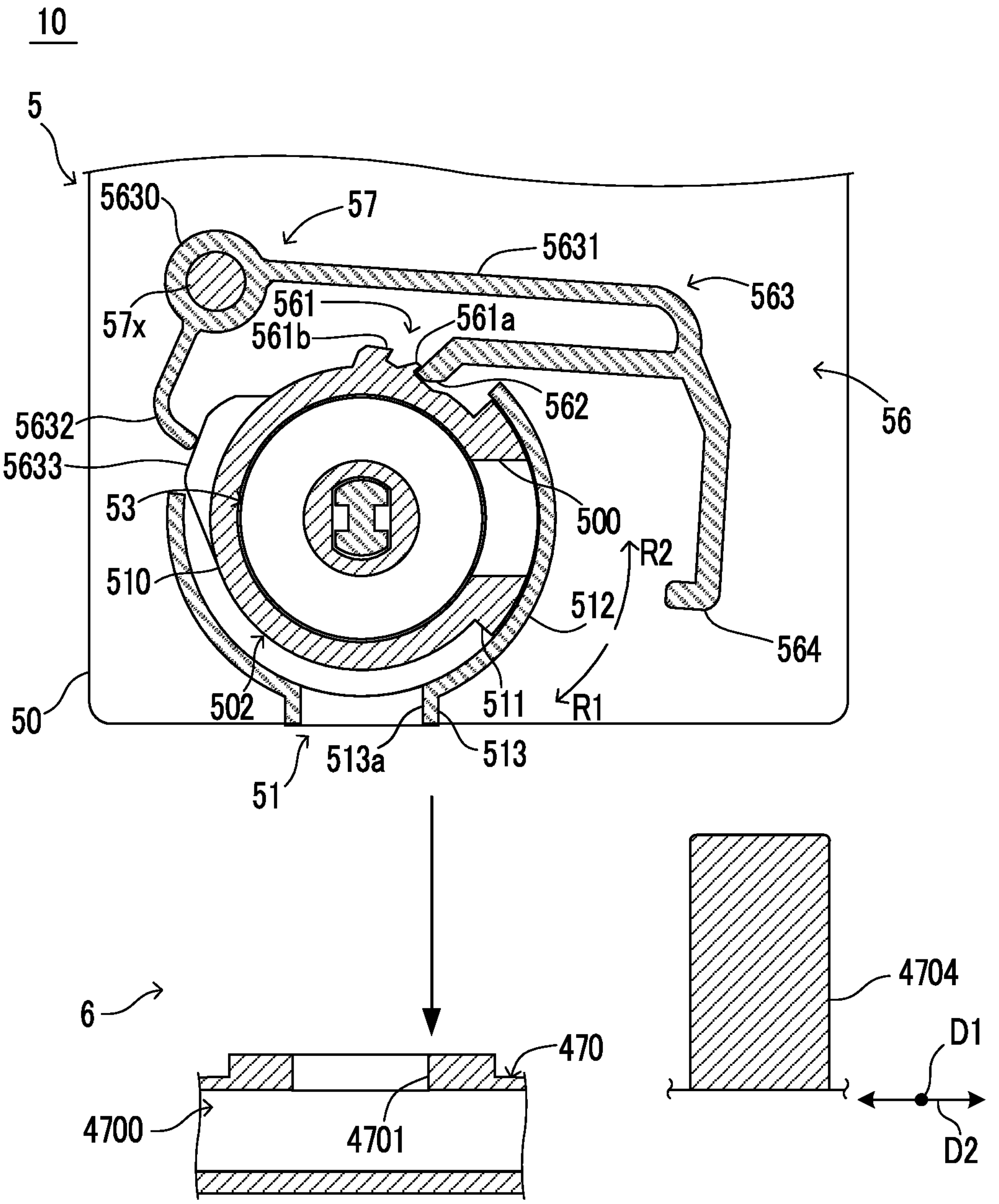
FIG. 11 is a cross-sectional view of a shutter lock mechanism of the toner container in the image forming apparatus according to the first embodiment (the toner container is not attached and the feeding portion is positioned at the closed position).

The shutter mechanism 51, in addition to the force receiving portion 52, includes a feeding portion 511, a shutter portion 512, and a communication portion 513 (see FIG. 11).

In the present embodiment, the toner container 5 includes a cover member 502 that is part of the storage portion 50 (see FIG. 11). The cover member 502 is rotatably attached to the main body portion of the storage portion 50. The cover member 502 has a round frame portion 510 forming a cylindrical frame.

The force receiving portion 52 and the feeding portion 511 are integrally configured with the round frame portion 510. The force receiving portion 52 and the feeding portion 511 are formed on an outer peripheral surface of the round frame portion 510. The feeding portion 511 is a portion in which the feeding port 500 is formed. The communication portion 513 is formed with a communication port 513*a*, which is a through hole.

The shutter portion 512 is a part that closes the feeding port 500. The shutter portion 512 and the communication portion 513 are formed integrally with the main body portion of the storage portion 50. The communication portion 513 is arranged below the cover member 502, and the shutter portion 512 is arranged on a side of the cover member 502.

Figure 12:
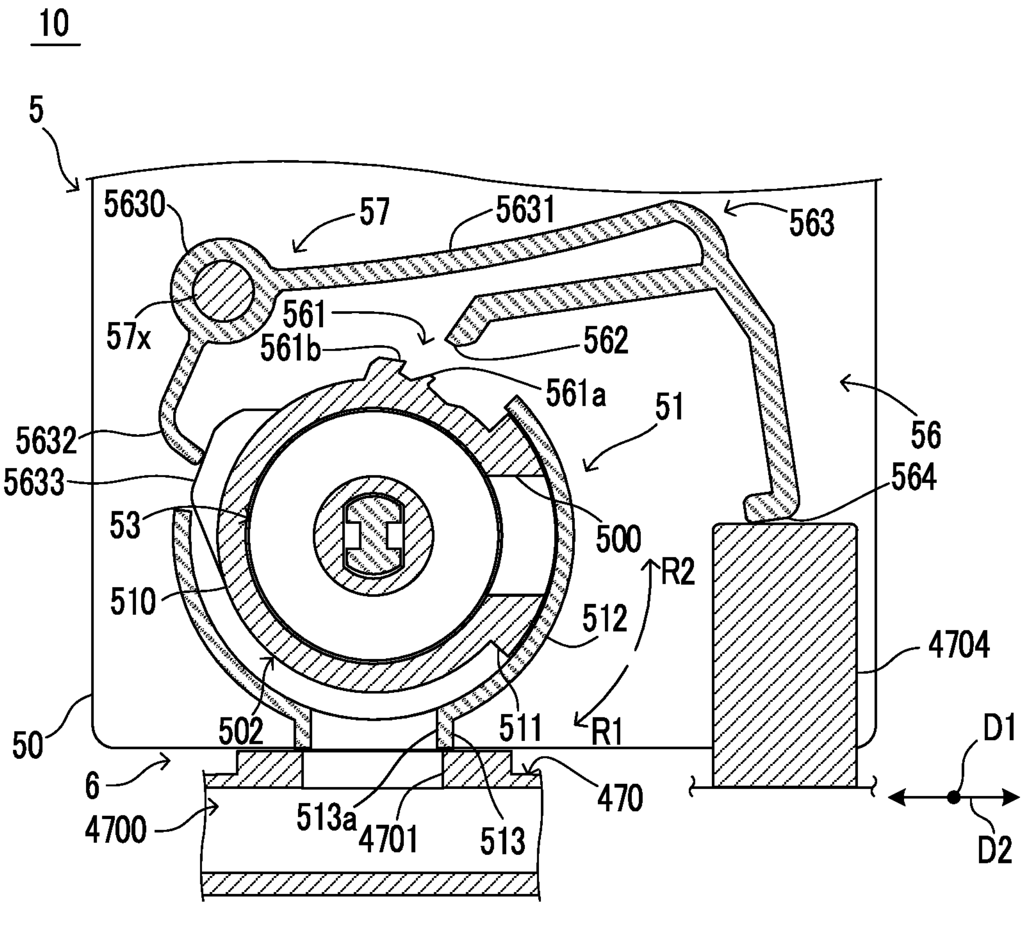
FIG. 12 is a cross-sectional view of the shutter lock mechanism of the toner container in the image forming apparatus according to the first embodiment (the toner container is attached and the feeding portion is positioned at the closed position).
Figure 13:
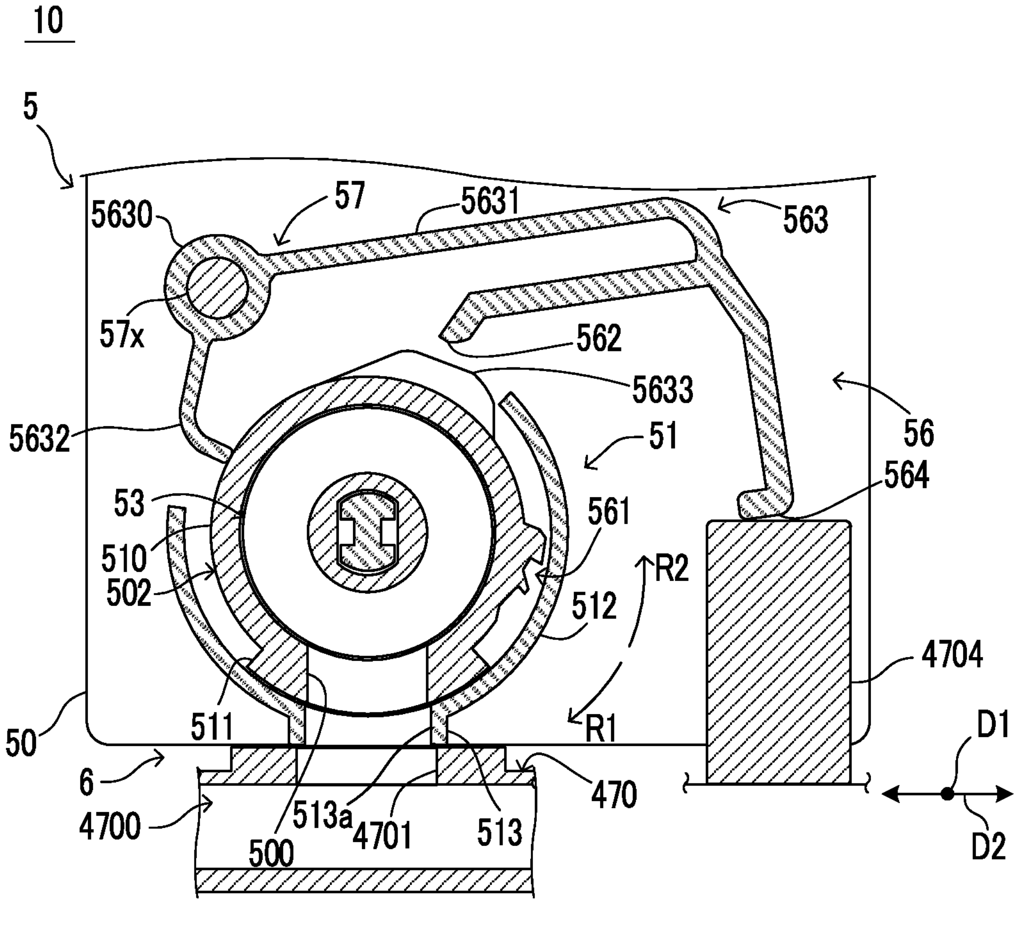
FIG. 13 is a cross-sectional view of the shutter lock mechanism of the toner container in the image forming apparatus according to the first embodiment (the toner container is attached and the feeding portion is positioned at the open position).

By the cover member 502 rotating, the feeding portion 511 moves from one of the closed position and the open position to the other. FIGS. 11 and 12 show a state in which the feeding portion 511 is at the closed position. FIG. 13 shows a state in which the feeding portion 511 is at the open position.

When the feeding portion 511 is at the closed position, the shutter portion 512 closes the feeding port 500 (see FIGS. 11 and 12). When the feeding portion 511 is at the open position, the feeding port 500 and the communication port 513*a* communicate with each other, and the feeding port 500 is opened (see FIG. 13).

The communication port 513*a* communicates with the receiving port 4701 of the toner conveying path 4700 formed in the intermediate transfer unit 470.

When the feeding portion 511 is at the open position, the inside of the storage portion 50 and the inside of the toner conveying path 4700 communicate with each other via the feeding port 500, the communication port 513*a*, and the receiving port 4701 (see FIG. 13).

When the feeding portion 511 is at the open position, by the screw conveying member 53 rotating n the storage portion 50, the toner 90 is fed to the toner transport path 4700 through the feeding port 500, the communication port 513*a*, and the receiving port 4701.

The force receiving portion 52 and the round frame portion 510 move the feeding portion 511 from the closed position to the open position when receiving a force in the first direction R1 from the force applying portion 64. Furthermore, the force receiving portion 52 and the round frame portion 510 move the feeding portion 511 from the open position to the closed position when receiving a force in the second direction R2 from the force applying portion 64.

In the present embodiment, the feeding portion 511 is an example of a linking portion that links with the force applying portion 64. In addition, the force receiving portion 52 and the round frame portion 510 are an example of a shutter linking mechanism.

[Configuration of Attachment Portion 6]

The attachment portion 6 includes the first cover linking mechanism 6*x* (see FIGS. 6 to 9). Furthermore, the attachment portion 6 includes four rotation output portions 65 and four holders 66 (see FIGS. 9 and 10). The rotation output portions 65 are rotatably supported by the holders 66.

The first cover linking mechanism 6*x* includes four force applying portions 64. The four force applying portions 64 and the four rotation output portions 65 correspond to the four toner containers 5, respectively.

By the toner container 5 being attached to the attachment portion 6, the force applying portion 64 engages with the force receiving portion 52, and the rotation output portion 65 engages with the rotation input portion 54.

When the toner container 5 is attached to the attachment portion 6, the force applying portion 64 applies a force in the first direction R1 or the second direction R2 to the force receiving portion 52 of the shutter mechanism 51. The rotation output portion 65 applies a rotational force to the rotation input portion 54.

The first cover linking mechanism 6*x* links with the opening and closing operation of the top cover 100 to move the force applying portion 64 between a non-operating position and an operating position. The non-operating position corresponds to the initial position P11 of the force receiving portion 52, and the operating position corresponds to the use position P12 of the force receiving portion 52.

Figure 9:
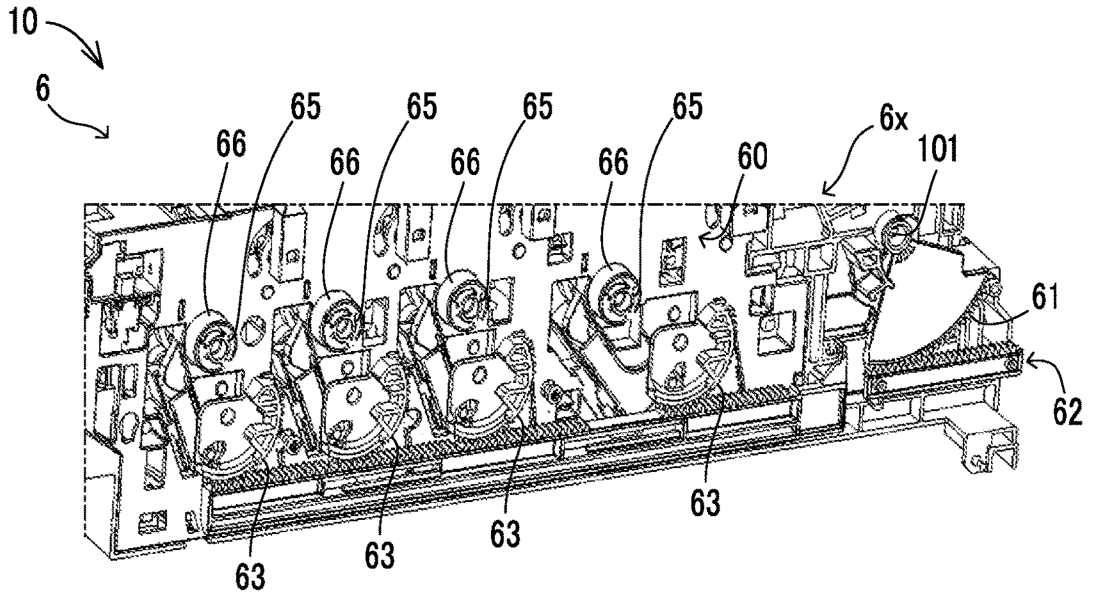
FIG. 9 is a cross-sectional view of the first cover linking mechanism when the cover portion is closed in the image forming apparatus according to the first embodiment.
Figure 10:
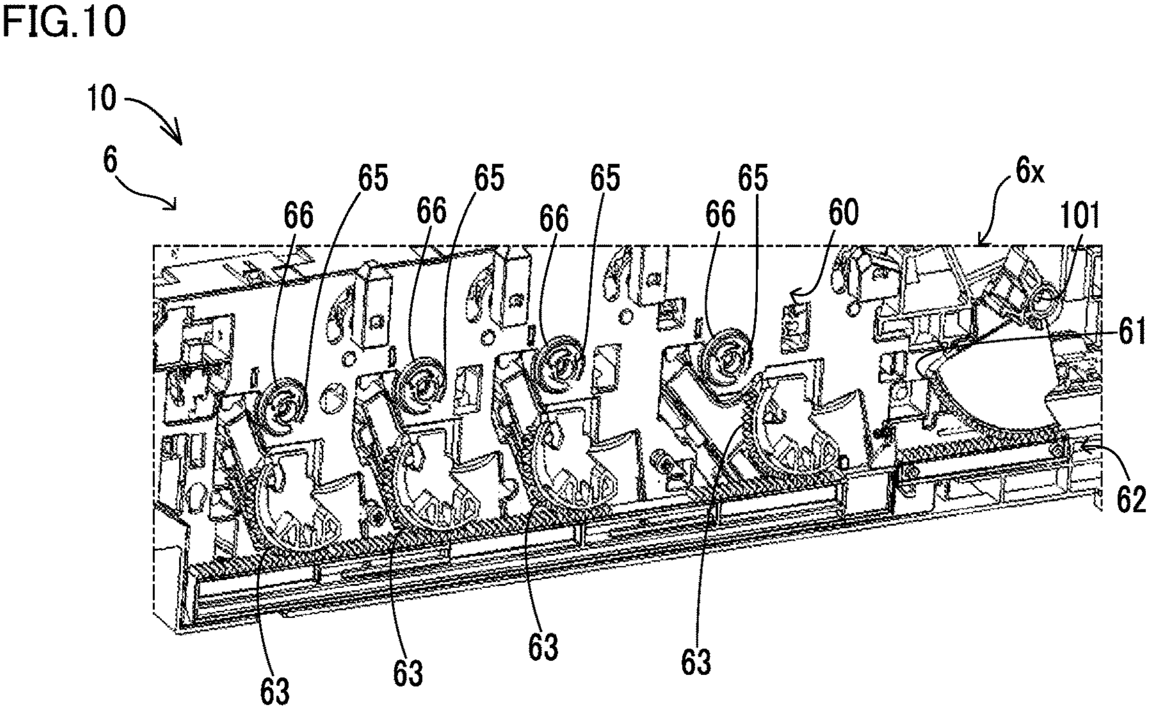
FIG. 10 is a cross-sectional view of the first cover linking mechanism when the cover portion is open in the image forming apparatus according to the first embodiment.

FIGS. 7 and 9 show a state in which the force applying portion 64 is at the non-operating position, and FIGS. 6 and 8 show a state in which the force applying portion 64 is at the operating position.

When the force applying portion 64 moves from the non-operating position to the operating position, the force receiving portion 52 receives a force in the first direction R1 from the force applying portion 64. Thus, the force receiving portion 52 moves from the initial position P11 to the use position P12, and the feeding portion 511 moves from the closed position to the open position (see FIGS. 6, 8, and 13). As a result, the feeding port 500 is opened.

When the force applying portion 64 moves from the operating position to the non-operating position, the force receiving portion 52 receives a force in the second direction R2 from the force applying portion 64. Thus, the force receiving portion 52 moves from the use position P12 to the initial position P11, and the feeding portion 511 moves from the open position to the closed position (see FIGS. 7, 9, and 12). As a result, the feeding port 500 is blocked by the shutter portion 512.

The first cover linking mechanism 6*x* further includes a first pinion gear 61, a rack gear 62, and four second pinion gears 63. Four second pinion gears 63 correspond to four toner containers 5.

The first pinion gear 61 is configured integrally with the rotating shaft 101 of the top cover 100. Therefore, the first pinion gear 61 rotates in conjunction with the rotating shaft 101.

The second pinion gears 63 are configured integrally with the force applying portions 64 (see FIGS. 6 to 9). The rack gear 62 is movably supported by a support plate 60.

The first pinion gear 61 and the four second pinion gears 63 engage with the first pinion gear 61. Therefore, each of the force applying portions 64 is linked with the opening and closing operations of the top cover 100.

The first cover linking mechanism 6*x* moves each of the force applying portions 64 in the first direction R1 when the top cover 100 is closed. Thus, the force receiving portion 52 receives a force in the first direction R1 from the force applying portions 64 and moves from the initial position P11 to the use position P12. As a result, the feeding port 500 of each toner container 5 is opened.

On the other hand, the first cover linking mechanism 6*x* moves each of the force applying portions 64 in the second direction R2 when the top cover 100 is opened. Thus, the force receiving portion 52 receives a force in the second direction R2 from the force applying portions 64 and moves from the use position P12 to the initial position P11. As a result, the feeding port 500 of each toner container 5 is closed by the shutter portion 512.

The action of the first cover linking mechanism 6*x*, without requiring any special operation, prevents the toner 90 from being scattered when the top cover 100 is opened.

The four holders 66 are supported the support plate 60 so as to be movable in the horizontal direction. Each rotation output portion 65 is driven by a driving device (not shown) to rotate. Each holder 66 links with the first cover linking mechanism 6*x* by a slide mechanism (not shown).

When the top cover 100 closes, the slide mechanism moves the four rotation output portions 65 and the four holders 66 toward the toner containers 5. Thus, the rotation output portions 65 engage with each of the rotation input portions 54 of the toner containers 5.

When the top cover 100 opens, the slide mechanism moves the four rotation output portions 65 and the four holders 66 away from the four toner containers 5. Thus, the engagement between the rotation output portions 65 and the rotation input portions 54 of the toner containers 5 is released.

[Configuration of Shutter Lock Mechanism 56]

The shutter lock mechanism 56 includes an engaged portion 561, an engaging portion 562, a biasing portion 563, and a contact portion 564 (see FIG. 11).

The engaged portion 561 is formed integrally with the feeding portion 511. In the present embodiment, the engaged portion 561 and the feeding portion 511 are formed integrally with the round frame portion 510. The engaged portion 561 is formed so as to protrude from an outer peripheral surface of the round frame portion 510.

Therefore, when the feeding portion 511 moves, the engaged portion 561 moves together with the feeding portion 511. In addition, by restricting the movement of the engaged portion 561, the movement of the feeding portion 511 is also restricted.

The engaging portion 562, by engaging with the engaged portion 561, restricts the movement of the feeding portion 511 toward the open position side. That is, when the engaging portion 562 is engaged with the engaged portion 561, the movement of the feeding portion 511 in the first direction R1 is restricted.

Figure 15:
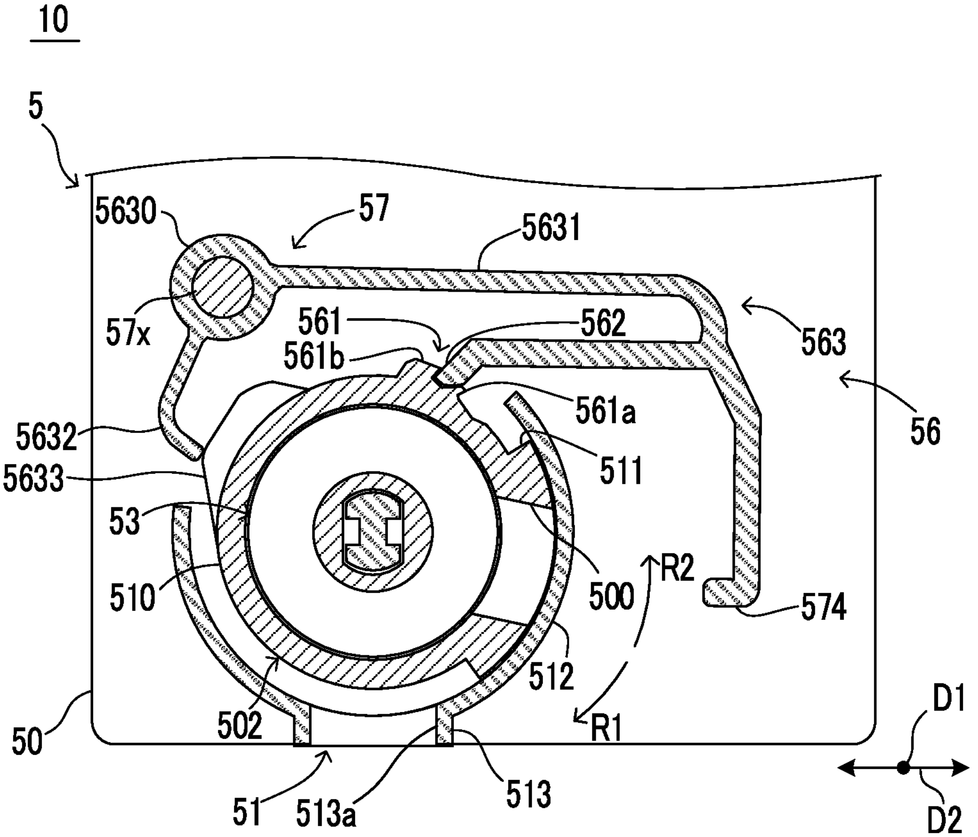
FIG. 15 is a cross-sectional view of the shutter lock mechanism of the toner container in the image forming apparatus according to the first embodiment (the toner container is not attached and the feeding portion is positioned at the semi-closed position).

Hereinafter, the position of the engaging portion 562 when the engaging portion 562 is able to be engaged with the engaged portion 561 will be referred to as the engaging position. FIGS. 11 and 15 show a state when the engaging portion 562 is at the engaging position.

Figure 14:
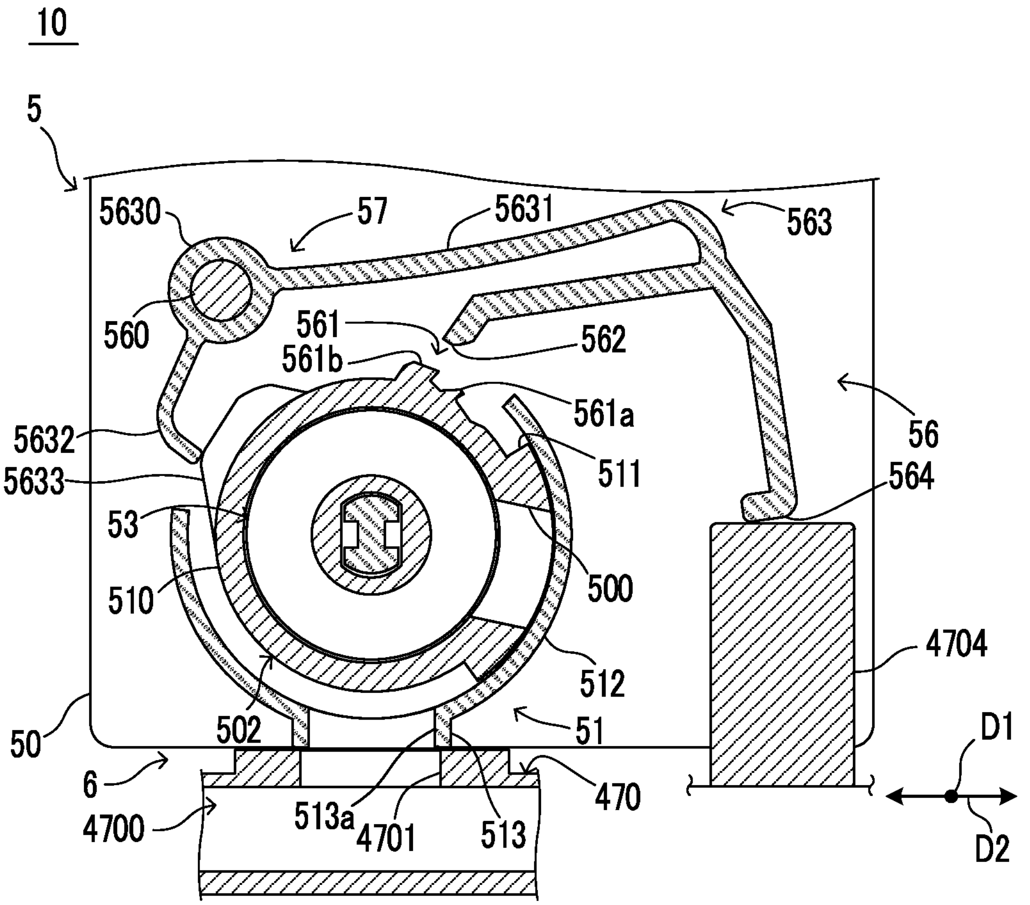
FIG. 14 is a cross-sectional view of the shutter lock mechanism of the toner container in the image forming apparatus according to the first embodiment (the toner container is attached and the feeding portion is positioned at a semi-closed position).

The engaging portion 562 is movable from the engagement position to the released position. The released position is a position separated from the engaged portion 561. FIGS. 12 to 14 show a state when the engaging portion 562 is at the released position.

When the engaging portion 562 is at the released position, the engagement between the engaging portion 562 and the engaged portion 561 is released, and the restriction of the movement of the feeding portion 511 is released.

The biasing portion 563 elastically biases the engaging portion 562 toward the engaging position. In the present embodiment, the biasing portion 563 has a base portion 5630, a first arm portion 5631, a second arm portion 5632, and ribs 5633.

The base portion 5630 is rotatably supported by a support shaft 560 protruding from the storage portion 50. The first arm portion 5631 and the second arm portion 5632 are each formed extending from the base portion 5630 in a direction intersecting the support shaft 560.

The first arm portion 5631 and the second arm portion 5632 each extend from the base portion 5630 in different directions. The first arm portion 5631 is branched into two. The engaging portion 562 and the contact portion 564 are tip-end portions of the two branched portions of the first arm portion 5631.

In the present embodiment, a pivoting member 57 pivotally supported around the support shaft 560 includes the base portion 5630, the first arm portion 5631, the second arm portion 5632, the engaging portion 562, and the contact portion 564.

The ribs 5633 are formed to protrude from the outer peripheral surface of the round frame portion 510. The tip-end portion of the second arm portion 5632 comes in contact with the ribs 5633. Thus, the pivoting motion of the pivoting member 57 is restricted, and the elastic force of the first arm portion 5631 biases the engaging portion 562 toward the engaging position. The elastic force of the first arm portion 5631 is the biasing force of the biasing portion 563.

In the present embodiment, a contacted portion 4704 is formed to protrude upward from the intermediate transfer unit 470.

The contact portion 564 is formed integrally with the engaging portion 562. When the toner container 5 is attached to the attachment portion 6, the contact portion 564 comes in contact with the contacted portion 4704 provided on the attachment portion 6 (see FIGS. 12 to 14).

When the toner container 5 is attached to the attachment portion 6, the first arm portion 5631 is bent by the force that the contact portion 564 receives from the contacted portion 4704 (see FIGS. 12 and 13). Thus, the engaging portion 562 moves to the released position against the biasing force of the biasing portion 563 and is held at the released position.

That is, the engaging portion 562 moves from the engaging position to the released position due to the force that the contact portion 564 receives from the contacted portion 4704, and is held at the released position.

When the engaging portion 562 is at the released position, the feeding portion 511 is movable in the first direction R1. That is, by the toner container 5 being attached to the attachment portion 6, the feeding portion 511 is able to move to the open position in conjunction with the opening operation of the top cover 100.

By the feeding portion 511 moving to the open position, the ribs 5633 move to a position out of contact with the second arm portion 5632 (see FIG. 13). Thus, the second arm portion 5632 moves to a position of coming in contact with the round frame portion 510, and the bending of the first arm portion 5631 is relaxed or eliminated.

Note that the attachment portion 6 includes a temporary holding mechanism (not shown) that holds the toner container 5 in the attachment portion 6. The temporary holding mechanism holds the toner container 5 with such a force that the toner container 5 is not lifted by a force received from the contacted portion 4704.

The toner container 5 is removed from the attachment portion 6 when the top cover 100 is open. In a case where the top cover 100 is open, the feeding portion 511 is at the closed position due to the action of the first cover linking mechanism 6*x*.

When the toner container 5 is removed from the attachment portion 6, the contact portion 564 is separated from the contacted portion 4704. Thus, the engaging portion 562 moves from the released position to the engaging position due to the biasing force of the biasing portion 563.

Therefore, in a case where the toner container 5 is removed from the attachment portion 6, the engaging portion 562 restricts the movement of the feeding portion 511 to the open position side. Thus, the shutter mechanism 51 is prevented from being switched from the closed state to the open state by careless operation.

As described above, the shutter lock mechanism 56 moves the engaging portion 562 from the engaging position to the released position when the toner container 5 is attached to the attachment portion 6. In addition, the shutter lock mechanism 56 moves the engaging portion 562 from the released position to the engaged position when the toner container 5 is removed from the attachment portion 6.

In the present embodiment, the engaged portion 561 includes a first engaged portion 561*a* and a second engaged portion 561*b* (see FIGS. 11, 12, 14 and 15). When the feeding portion 511 is at the closed position, the engaging portion 562 engages with the first engaged portion 561*a* (see FIG. 11).

When the feeding portion 511 is at the semi-closed position, the engaging portion 562 engages with the second engaged portion 561*b* (see FIG. 15). The semi-closed position is a position between the closed position and the open position. FIGS. 14 and 15 show the feeding portion 511 at the semi-closed position.

That is, when the engaging portion 562 is at the engaging position, the engaging portion 562 engages with the engaged portion 561 even in a case where the feeding portion 511 is at the closed position or the semi-closed position (See FIGS. 11 and 15).

In addition, when the feeding portion 511 is at a region from the semi-closed position to the closed position, the shutter part 512 closes the feeding port 500 (see FIGS. 14 and 15).

In the image forming apparatus 10, there are cases in which the toner container 5 may be removed from the attachment portion 6 in a state in which the top cover 100 is incompletely opened. In this case, the toner container 5 may be removed from the attachment portion 6 in a state in which the feeding portion 511 is at the region from the semi-closed position to the closed position (see FIGS. 14 and 15).

The state in which the feeding portion 511 is at the region from the semi-closed position to the closed position is a state before the shutter mechanism 51 is completely switched from the open state to the closed state.

By adopting the shutter lock mechanism 56, even in a case where the shutter mechanism 51 is not at the completely closed state, the shutter mechanism 51 is prevented from being switched to the open state by careless operation.

[Second Embodiment]

Next, an image forming apparatus 10A according to a second embodiment will be described with reference to FIGS. 16 to 19.

The image forming apparatus 10A has a configuration in which the four toner containers 5 of the image forming apparatus 10 are replaced with four toner containers 5A.

In addition, the toner container 5A has a configuration in which the shutter lock mechanism 56 of the toner container 5 is replaced with a shutter lock mechanism 56A.

Figure 16:
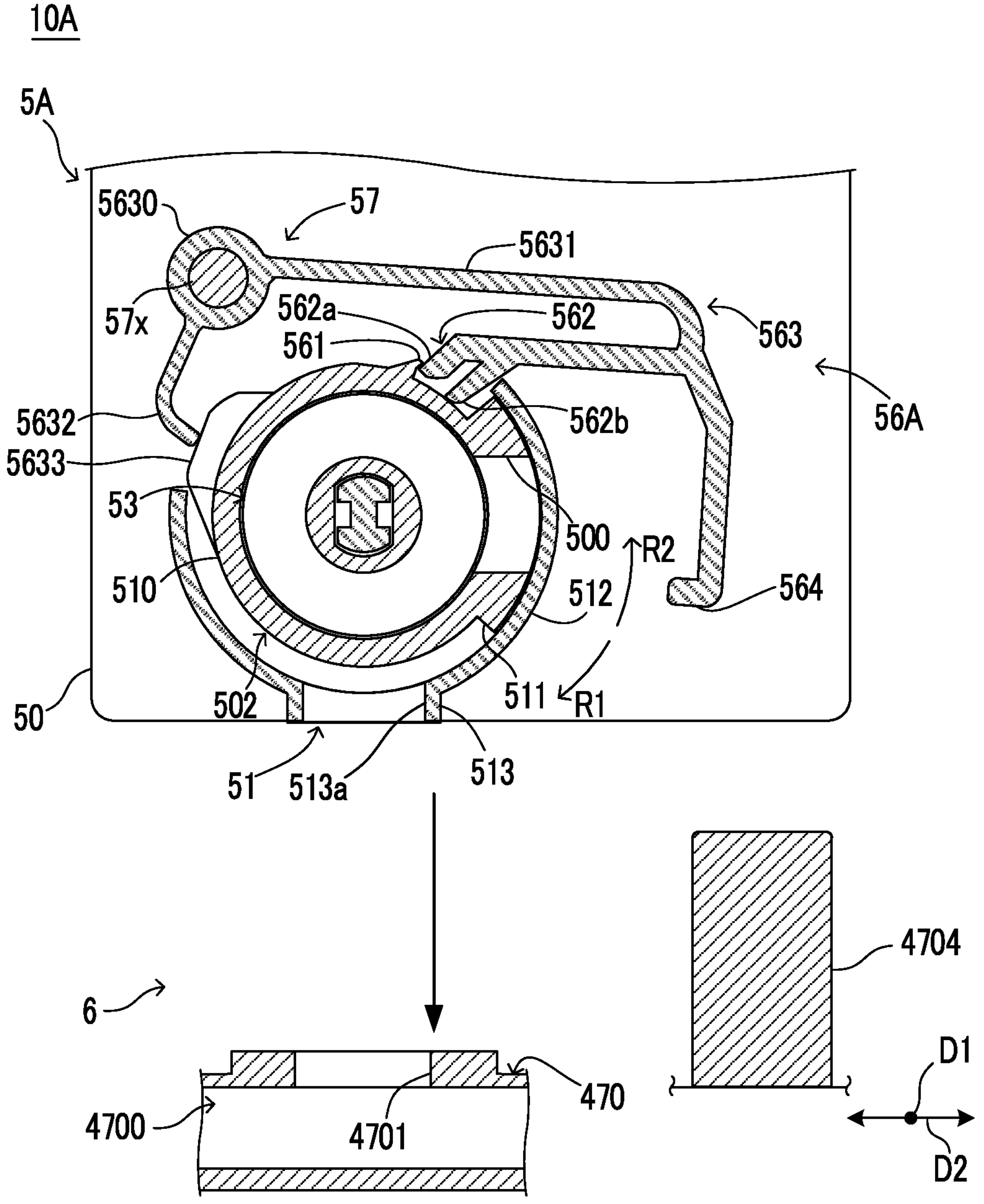
FIG. 16 is a cross-sectional view of the shutter lock mechanism of the toner container in the image forming apparatus according to a second embodiment (the toner container is not attached and the feeding portion is positioned at the closed position).

The shutter lock mechanism 56A, similar to the shutter lock mechanism 56, includes an engaged portion 561, an engaging portion 562, a biasing portion 563, and a contact portion 564 (see FIG. 16).

The engaging portion 562, by engaging with the engaged portion 561, restricts the movement of the feeding portion 511 toward the open position side. That is, when the engaging portion 562 is engaged with the engaged portion 561, the movement of the feeding portion 511 in the first direction R1 is restricted.

The state of the shutter lock mechanism 56A and the shutter mechanism 51 shown in FIG. 16 corresponds to the state of the shutter lock mechanism 56 and the shutter mechanism 51 shown in FIG. 11.

Figure 17:
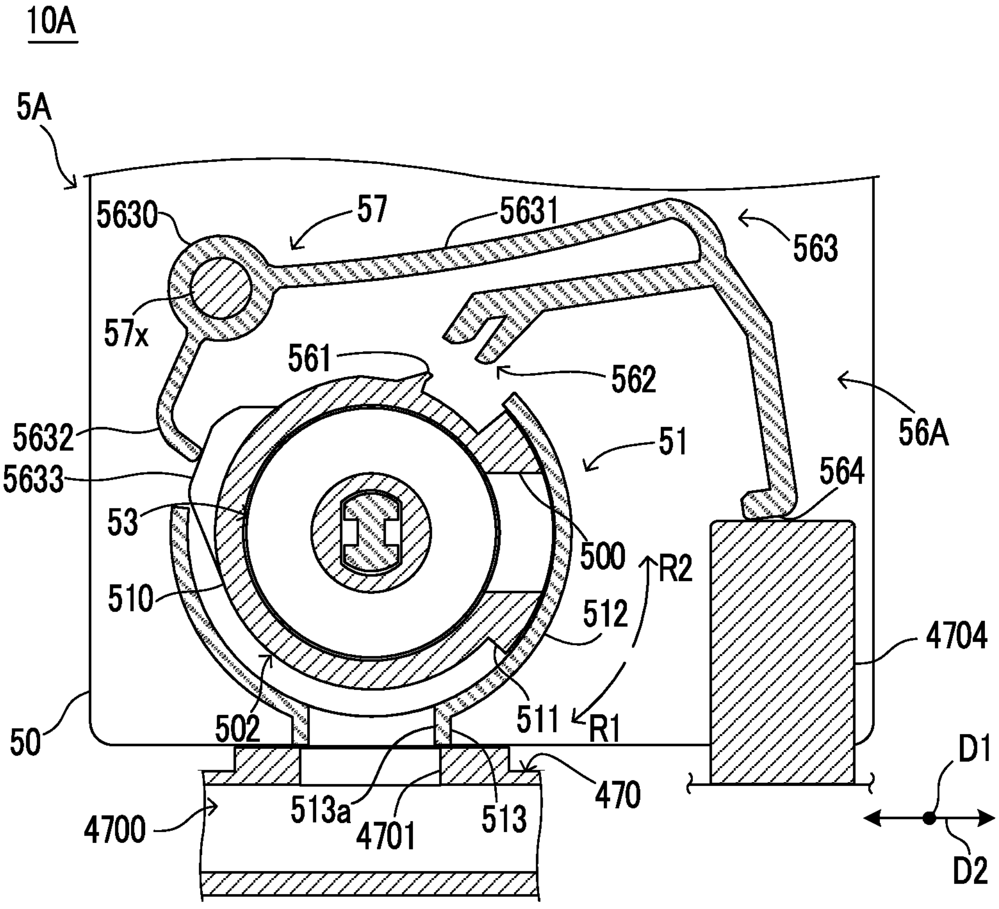
FIG. 17 is a cross-sectional view of the shutter lock mechanism of the toner container in the image forming apparatus according to the second embodiment (the toner container is attached and the feeding portion is positioned at the closed position).

The state of the shutter lock mechanism 56A and the shutter mechanism 51 shown in FIG. 17 corresponds to the state of the shutter lock mechanism 56 and the shutter mechanism 51 shown in FIG. 12.

In the shutter lock mechanism 56A, the engaging portion 562 has a first engaging portion 562*a* and a second engaging portion 562*b* (see FIGS. 16, 19, and 20) Note that the engaged portion 561 of the shutter lock mechanism 56A is not divided into a first engaged portion 561*a* and a second engaged portion 561*b*.

The first engaging portion 562*a* engages with the engaged portion 561 when the feeding portion 511 is at the closed position (see FIG. 16). The second engaging portion 562*b* engages with the engaged portion 561 when the feeding portion 511 is at the semi-closed position (see FIG. 20).

Figure 18:
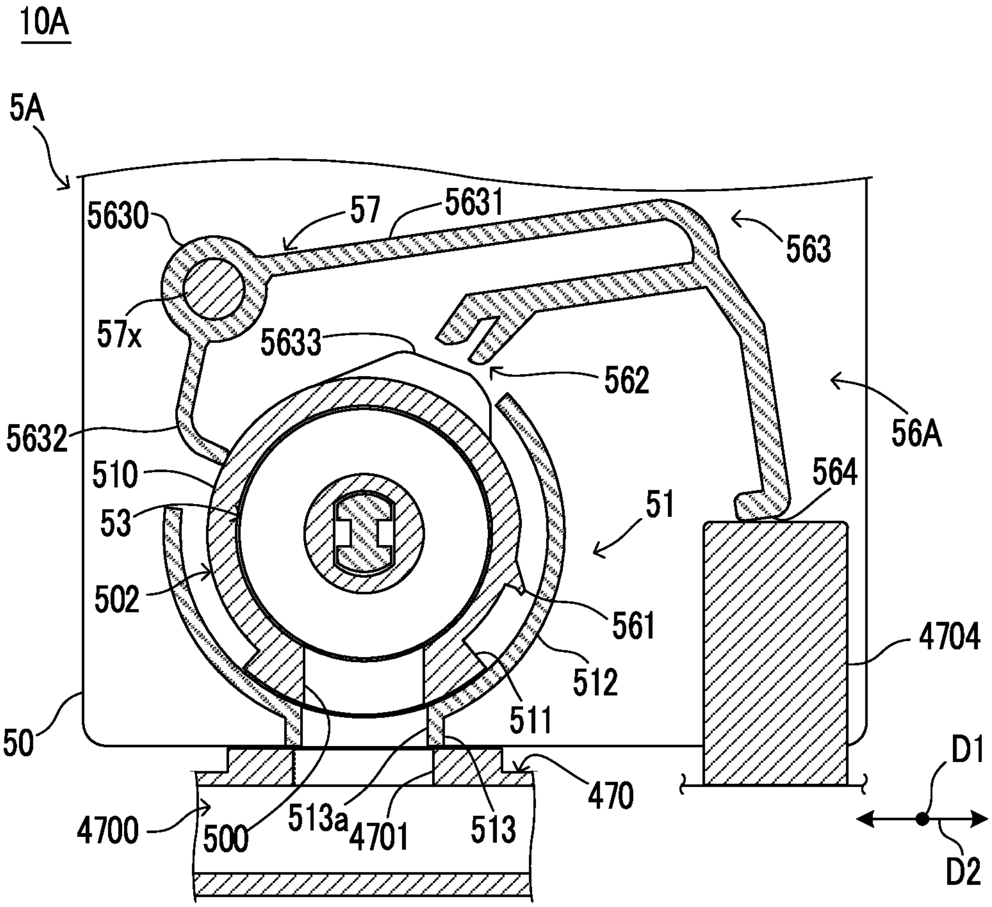
FIG. 18 is a cross-sectional view of the shutter lock mechanism of the toner container in the image forming apparatus according to the second embodiment (the toner container is attached and the feeding portion is positioned at the open position).

The state of the shutter lock mechanism 56A and the shutter mechanism 51 shown in FIG. 18 corresponds to the state of the shutter lock mechanism 56 and the shutter mechanism 51 shown in FIG. 13.

Figure 19:
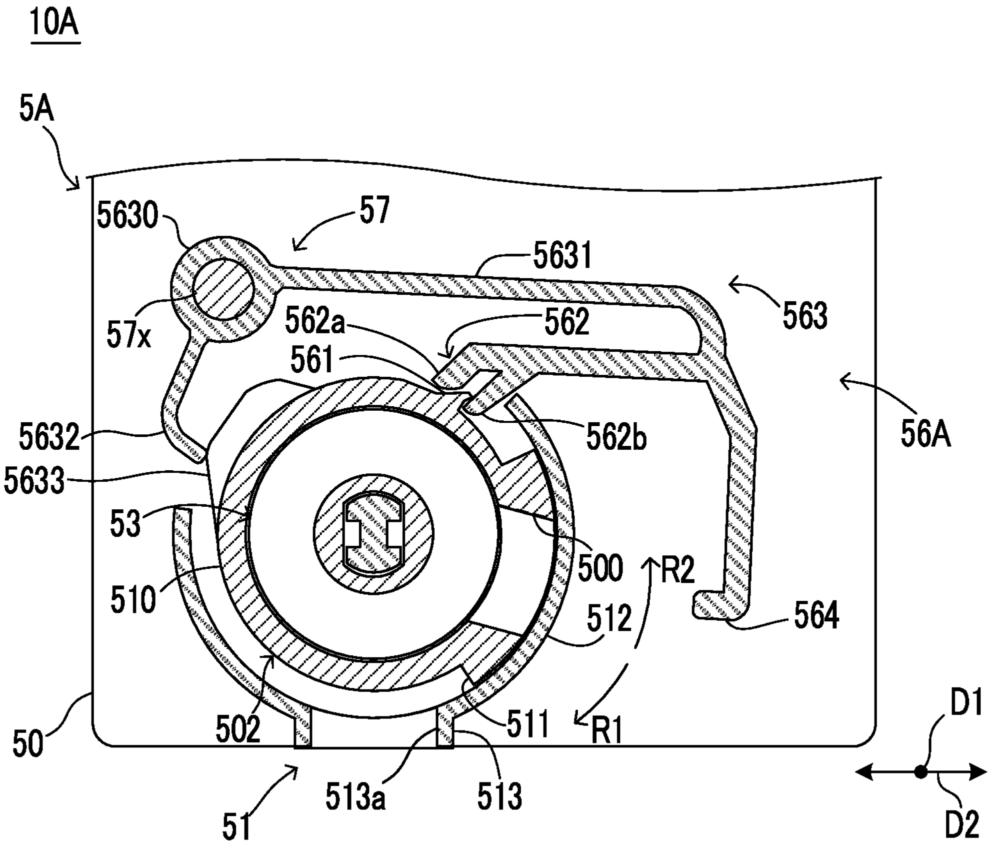
FIG. 19 is a cross-sectional view of the shutter lock mechanism of the toner container in the image forming apparatus according to the second embodiment (the toner container is not attached and the feeding portion is positioned at the semi-closed position).

The state of the shutter lock mechanism 56A and the shutter mechanism 51 shown in FIG. 19 corresponds to the state of the shutter lock mechanism 56 and the shutter mechanism 51 shown in FIG. 15.

Even in a case where the image forming apparatus 10A is adopted, a similar effect as in a case where the image forming apparatus 10 is adopted may be obtained.

[Application Example]

An application example of the shutter mechanism 51 and shutter lock mechanisms 56 and 56A will be described below.

In the toner container 5, 5A, the feeding portion 511 is the linking portion that links with the force applying portion 64, and the shutter portion 512 is fixed (see FIGS. 11 to 19).

In this application example, the shutter portion 512 is the linking portion that links with the force applying portion 64. In this case, the feeding portion 511 is fixed so that the feeding port 500 faces downward.

The shutter portion 512 is movable between the closed position that closes the feeding port 500 and the open position that opens the feeding port 500.

In addition, in this application example, the engaged portion 561 is formed integrally with the shutter portion 512. The engaging portion 562 restricts the movement of the shutter portion 512 toward the open position side by engaging with the engaged portion 561 at the engaging position.

Even in a case where this application example is adopted, similar effects as when the shutter mechanism 51 and the shutter lock mechanisms 56 and 56A are adopted may be obtained.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A toner container that is detachably attached to an attachment portion of an image forming apparatus, the toner container comprising:

a storage portion configured to store toner;

a feeding portion formed with a feeding port that communicates between an inner portion and an outer portion of the storage portion;

a shutter portion configured to close the feeding port;

a shutter linking mechanism that, when receiving a force in a first direction from a force applying portion provided on the attachment portion, is configured to move a linking portion that is one of the feeding portion and the shutter portion from a closed position where the feeding port is closed by the shutter portion to an open position where the feeding port is open; and when receiving a force in a second direction from the force applying portion, is configured to move the linking portion from the open position to the closed position; and a shutter lock mechanism including an engaged portion integrally formed with the linking portion and an engaging portion that restricts movement of the linking portion to the open position side by engaging with the engaged portion, and that, when the toner container is attached to the attachment portion, is configured to move the engaging portion from an engaging position to a released position; and when the toner container is removed from the attachment portion, is configured to move the engaging portion from the released position to the engaging position, wherein the released position is a position separated from the engaged portion, when the engaging portion is at the engaging position, the engaging portion engages with the engaged portion in both a case where the linking portion is at the closed position, and a case where the linking portion is at a semi-closed position between the closed position and the open position, when the linking portion is at a region from the semi-closed position to the closed position, the shutter portion closes the feeding port, and the engaged portion includes:

a first engaged portion configured to engage with the engaging portion when the linking portion is at the closed position; and a second engaged portion configured to engage with the engaging portion when the linking portion is at the semi-closed position.

2. A toner container that is detachably attached to an attachment portion of an image forming apparatus, the toner container comprising:

a storage portion configured to store toner;

a feeding portion formed with a feeding port that communicates between an inner portion and an outer portion of the storage portion;

a shutter portion configured to close the feeding port;

a shutter linking mechanism that, when receiving a force in a first direction from a force applying portion provided on the attachment portion, is configured to move a linking portion that is one of the feeding portion and the shutter portion from a closed position where the feeding port is closed by the shutter portion to an open position where the feeding port is open; and when receiving a force in a second direction from the force applying portion, is configured to move the linking portion from the open position to the closed position; and a shutter lock mechanism including an engaged portion integrally formed with the linking portion and an engaging portion that restricts movement of the linking portion to the open position side by engaging with the engaged portion, and that, when the toner container is attached to the attachment portion, is configured to move the engaging portion from an engaging position to a released position; and when the toner container is removed from the attachment portion, is configured to move the engaging portion from the released position to the engaging position, wherein the released position is a position separated from the engaged portion, when the engaging portion is at the engaging position, the engaging portion engages with the engaged portion in both a case where the linking portion is at the closed position, and a case where the linking portion is at a semi-closed position between the closed position and the open position, when the linking portion is at a region from the semi-closed position to the closed position, the shutter portion closes the feeding port, and the engaging portion includes:

a first engaging portion configured to engage with the engaged portion when the linking portion is at the closed position; and a second engaging portion configured to engage with the engaged portion when the linking portion is at the semi-closed position.

3. The toner container according to claim 1, wherein the shutter lock mechanism comprises:

a biasing portion configured to bias the engaging portion toward the engaging position; and a contact portion formed integrally with the engaging portion and configured to come in contact with a contacted portion provided on the attachment portion when the toner container is attached to the attachment portion; and the engaging portion moves from the engaging position to the released position by a force the contact portion receives from the contacted portion.

4. An image forming apparatus, comprising:

a toner container;

an attachment portion to which the toner container is detachably attached;

a main body enclosing the attachment portion and having a main opening leading to the attachment portion;

a cover portion supported by the main body and capable of opening and closing the main opening; and a cover linking mechanism including a force applying portion configured to apply a force to a shutter linking mechanism included in the toner container when the toner container is attached to the attachment portion, the cover linking mechanism configured to link the force applying portion with the opening and closing operation of the cover portion, wherein the toner container comprises:

a storage portion configured to store toner;

a feeding portion formed with a feeding port that communicates between an inner portion and an outer portion of the storage portion;

a shutter portion configured to close the feeding port;

the shutter linking mechanism, which is configured such that, when receiving a force in a first direction from the force applying portion provided on the attachment portion, is configured to move a linking portion that is one of the feeding portion and the shutter portion from a closed position where the feeding port is closed by the shutter portion to an open position where the feeding port is open; and when receiving a force in a second direction from the force applying portion, is configured to move the linking portion from the open position to the closed position; and a shutter lock mechanism including an engaged portion integrally formed with the linking portion and an engaging portion that restricts movement of the linking portion to the open position side by engaging with the engaged portion, and configured to, when the toner container is attached to the attachment portion, move the engaging portion from an engaging position to a released position; and when the toner container is removed from the attachment portion, move the engaging portion from the released position to the engaging position, wherein the released position is a position separated from the engaged portion, when the engaging portion is at the engaging position, the engaging portion engages with the engaged portion in both a case where the linking portion is at the closed position, and a case where the linking portion is at a semi-closed position between the closed position and the open position, when the linking portion is at a region from the semi-closed position to the closed position, the shutter portion closes the feeding port, and the cover linking mechanism moves the force applying portion in a first direction when the cover portion is closed, and moves the force applying portion in a second direction when the cover portion is opened.

* * * * *